Patented Dec. 19, 1933

1,940,391

UNITED STATES PATENT OFFICE 1,940,391

PROCESS FOR BREAKING PETROLEUM EMULSIONS

Melvin De Groote, St. Louis, and Arthur F. Wirtel, Richmond Heights, Mo., assignors to Tretolite Company, Webster Groves, Mo., a corporation of Missouri No Drawing. Application January 21, 1933
Serial No. 652,941

6 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsions. They are obtained from producing wells and from the bottoms of oil storage tanks, and are commonly referred to as "cut oil", "roily oil", "emulsified oil" and "bottom settlings".

The object of our invention is to provide a novel, inexpensive and efficient process for separating emulsions of the kind referred to into their component parts of oil and water or brine.

Briefly described, our process consists in subjecting a petroleum emulsion of the water-in-oil type, to the action of a treating agent or demulsifying agent consisting of a naphthenic acid body or a mixture of naphthenic acids of the kind hereinafter described, thereby causing the emulsion to break down and separate into its component parts of oil and water or brine, when the emulsion is permitted to remain in a quiescent state after such treatment.

Naphthenic acids include classes of materials whose molecular weights vary from less than 200 to as much as 1600. Naphthenic acids of similar molecular weights vary widely in their solubility in dilute alcohol. They vary widely in their distillation range. They also vary in regard to specific gravity and also in regard to iodine number. Some naphthenic acids exhibit marked iodine numbers, although the iodine numbers can not be attributed to an ethylene linkage of the ordinary type. Naphthenic acids are very similar in many respects to the acids of rosin; sodium naphthenate, being somewhat similar to sodium abietate. Sodium abietate and sodium naphthenate have generally been considered as substitutes for sodium oleate in soap, but they are not as effective as soap for use as detergents, and they are not as effective as sodium oleate for use in the demulsification of crude oil emulsions.

We have found that naphthenic acids of high molecular weights, for instance, over 600, seem to adsorb with petroleum bodies as if they formed mutual adsorption products. For example, high molecular weight naphthenic acids may react with calcium hydroxide solution in the absence of petroleum bodies. However, when high molecular weight naphthenic acids are mixed with petroleum bodies, such as lubricating oils, they seem to lose their chemical activity. Likewise, if naphthenic acids of very low molecular weight are employed, for instance, less than 200, it appears as if the calcium and magnesium salts are somewhat water-soluble. In resolving or breaking petroleum emulsions of the water-in-oil type, by a chemical treating agent or demulsifying agent, the amount of the demulsifying agent that is added to the emulsion is relatively small, usually not over one part of demulsifying agent to a thousand parts of emulsion, and sometimes only one part of demulsifying agent to 20,000 or 30,000 parts of emulsion. Thus, it will be seen that even the very slight water solubility of the calcium or magnesium salts of low molecular weight naphthenic acids may explain their relative inferiority as demulsifying agents in the resolution of petroleum emulsions.

The treating agent or demulsifying agent contemplated by our process consists of a naphthenic acid or a mixture of naphthenic acids, having a molecular weight not less than 200 and not over 575, having a mean molecular weight of approximately 225, and having a distillation range varying from approximately 230° to 310° C. A typical distillation range is shown in the following table:

| | |
|---|---|
| 10% | 230° C. |
| 20% | 255° C. |
| 30% | 268° C. |
| 40% | 273° C. |
| 50% | 278° C. |
| 60% | 279° C. |
| 70% | 287° C. |
| 80% | 292° C. |
| 85% | 292° C. |
| 100% | 310° C. |

These naphthenic acids should be soluble in 65% ethyl alcohol when 10% naphthenic acid is added, but they should be insoluble when only 5% is added. The selected naphthenic acids should show no substantial iodine number. When an iodine number determination is had by the Hübl-Waller method, they should not show an iodine number greater than 2 or 3. The saponification number should be in the neighborhood of 250. The specific gravity at 77° F. should be about 0.9635. Naphthenic acids of the kind above mentioned, or coming within the specification above described, are commercially available, and are of reasonable value for treating many petroleum emulsions to resolve the same. Reasonable variation from the above described specification may be made without departing from the spirit of our invention, but the variation should only be of the kind that one would expect in ordinary commercial products. If any marked deviation is made from the above mentioned specification of the naphthenic acids or mixture of acids used to constitute the treating agent, it will be found that they are substantially worthless. Hereinafter we will use the expression "naphthenic acid body of the kind defined" to mean a naphthenic acid, or a mixture of naphthenic acids coming within the molecular weight range, the mean molecular weight range and the distillation range, previously set forth.

Such naphthenic acids or mixtures can be used in the form of an acid, or in the form of a salt, or in the form of an ester or some other compound in which the hydrogen of the carboxyl group has been replaced by a suitable substitute, for instance, by the residue of a hydroxy amine. It has been known that certain hydroxy amines, for instance, triethanolamine, will combine with oleic acid. A similar combination can be made with naphthenic acid. The naphthenic acid or acids which we contemplate using may be combined with caustic soda, caustic potash, ammonium hydroxide, or any other suitable material. If the amount of water present in the salt, for instance, in the sodium naphthenate, is lower, the salts are generally oil-soluble. If the amount of the water increases, the salts are likely to be water-soluble and oil-insoluble. The salts can be used alone or mixed with unneutralized naphthenic acid of the kind defined. The calcium, magnesium, or aluminum salts can be produced in various ways, but they are not as effective as the water-soluble ammonium, sodium, or potassium salts. Likewise, the esters may be produced by simply heating the naphthenic acid with an alcohol such as glycerine. In this instance also it has been found that the esters are not as satisfactory for demulsification as the water-soluble salts, even if produced from aromatic or cyclic alcohols.

As previously stated, such naphthenic materials can be employed in the acid state to constitute the treating or demulsifying agent of our process, or can be employed after neutralization, or after esterification, or after reaction with a suitable hydroxy amine. So long as the naphthenic material comes within the term "naphthenic acid of the kind defined", which we have herein used to set forth the metes and bounds of our invention, it is immaterial whether the naphthenic material is in the form of an acid, or in the form of a salt, or in the form of an ester, or any other form in which the hydrogen of the carboxyl has been replaced by a suitable substitute. We prefer to use substantially anhydrous sodium naphthenate mixed with sufficient unneutralized naphthenic acid to make it readily oil-soluble. As previously stated, some of the naphthenic acid compounds contemplated by our invention may be oil-soluble, and some of them may be water-soluble, and some may exhibit solubility in both media. These naphthenic acid bodies may be diluted with any one of the numerous diluents which have been used for a long time in the dilution of commercial demulsifying agents, such, for example, as water, kerosene, or alcohol.

The advantage or superiority of the treating agent or demulsifying agent contemplated in our process, resides in its ability to treat certain emulsions better than any other materials selling at so low a cost. Naphthenic acids are sold as substitutes for fatty acids and are generally available at prices somewhat lower than the prices of fatty acids, and somewhat higher than the prices of rosin. Frequently there are refineries located near oil-producing centers, that are producing or which can readily produce naphthenic acids having the characteristics or coming within the specification previously set forth. Hence, a treating material that is readily available, or which can be transported at a low cost to the point where it is used has a decided commercial advantage over a material that cannot usually be obtained near the place where it is to be used. Naphthenic acids and mixtures of the type herein defined will find comparatively limited use as demulsifying agents, so far as the majority of oil field emulsions are concerned, but such acids in a suitable form will economically break or resolve certain oil field emulsions in a small number of cases more advantageously from a price basis than any other demulsifying agent now available. It is believed that the poor results previously obtained in attempts to employ naphthenic acid in demulsification were due largely to the selection of improper naphthenic acids.

In practicing our process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately 1 part of treating agent to 500 parts of emulsion, up to 1 part of treating agent to 20,000 or even 30,000 parts of emulsion. The proportion depends on the type of the emulsion being treated, and also upon the equipment being used, and the temperature employed. In treating exceptionally refractory emulsions of the kinds known as "tank bottoms" and "residual pit oils", the ratio of 1:500, above referred to, may be required. In treating fresh emulsions, i. e., emulsions that will yield readily to the action of chemical demulsifying agents, the ratio of 1:30,000, above referred to, may be sufficient to produce highly satisfactory results. In general, we have found that for an average petroleum emulsion, a ratio of 1 part of treating agent to 5000 parts of emulsion will usually be found to produce commercially satisfactory results.

Having thus described our invention, what we claim as new and desire to secure by Letters Patent is:

1. A process for breaking petroleum emulsions of the water-in-oil type, which consists in subjecting the emulsion to the action of a demulsifying agent containing a naphthenic acid body produced from naphthenic acids having a molecular weight range of from 200 to 575, a mean molecular weight of approximately 225, and a distillation range of from 230° to 310° C., and selected from the class comprising acids, salts and esters.

2. A process for breaking petroleum emulsions of the water-in-oil type, which consists in subjecting the emulsion to the action of a demulsifying agent containing a salt of a naphthenic acid produced from naphthenic acids having a molecular weight range of from 200 to 575, a mean molecular weight of approximately 225, and a distillation range of from 230° C. to 310° C.

3. A process for breaking petroleum emulsions of the water-in-oil type, which consists in subjecting the emulsion to the action of a demulsifying agent containing a water-soluble salt of a naphthenic acid produced from naphthenic acids having a molecular weight range of from 200 to 575, a mean molecular weight of approximately 225, and a distillation range of from 230° C. to 310° C.

4. A process for breaking petroleum emulsions of the water-in-oil type, which consists in subjecting the emulsion to the action of a demulsifying agent containing a sodium salt of a naphthenic acid produced from naphthenic acids having a molecular weight range of from 200 to 575, a mean molecular weight of approximately 225, and a distillation range of from 230° C. to 310° C.

5. A process for breaking petroleum emulsions of the water-in-oil type, which consists in subjecting the emulsion to the action of a demulsifying agent containing a substantially anhydrous sodium salt of a naphthenic acid produced from naphthenic acids having a molecular weight range of from 200 to 575, a mean molecular weight of approximately 225, and a distillation range of from 230° C. to 310° C.

6. A process for breaking petroleum emulsions of the water-in-oil type, which consists in subjecting the emulsion to the action of a demulsifying agent containing a substantially anhydrous sodium salt of a naphthenic acid produced from naphthenic acids having a molecular weight range of from 200 to 575, a mean molecular weight of approximately 225, and a distillation range of from 230° C. to 310° C., mixed with a relatively small amount of an unneutralized naphthenic acid of the same kind.

MELVIN DE GROOTE.
ARTHUR F. WIRTEL.